United States Patent Office 3,423,434
Patented Jan. 21, 1969

3,423,434
PROCESS FOR THE PREPARATION OF $\Delta^{1,4}$-3-KETO STEROIDAL COMPOUNDS
David Adriaan Van Dorp and Stefan Antoni Szpilfogel, Oss, Netherlands, assignors to Organon, Inc., Orange, N.J., a corporation of New Jersey
No Drawing. Filed May 29, 1956, Ser. No. 587,946
Claims priority, application Netherlands, May 31, 1955, 197,688
U.S. Cl. 260—397.3
Int. Cl. C07c 167/00
9 Claims This invention provides a process for the manufacture of 3-oxo-dehydro compounds of the cyclopentanopolyhydrophenanthrene series, which contain a double bond in the 1:2 and/or 4:5 positions, and functional derivatives thereof. These compounds are of great importance, because they include, in addition to genuine steroid hormones, substances of high biological activity, such e.g. as 1-dehydrocortisone, 1-dehydrohydrocortisone, 1-dehydro-aldosterone, and their 9 halogen derivatives, and substances of great industrial importance, e.g. $\Delta^{1,4}$-androstadiene-3-one-17-one or -17-ol.

The processes hitherto known for introducing a double bond into the 1:2 and/or 4:5 positions of steroids, involve either the introduction of halogen atoms into the 2 and/or 4 positions followed by the elimination of hydrogen halide or direct biochemical dehydrogenation of compounds saturated at least partially in the aforesaid positions.

This invention provides a process for making the aforesaid dehydro compounds in a simple manner, wherein 3-oxo-compounds of the cyclopentanopolyhydrophenanthrene series which are saturated in at least one of the α positions relatively to the 3-oxo group, are treated with a selenium compound having a dehydrogenating action. Thus the $\Delta^4$-3-keto compounds, the $\Delta^1$-5α-3-keto compounds, and the $\Delta^{1,4}$-3-keto compounds can be prepared. The $\Delta^4$-3-keto compounds are formed from the 5β-3-ketones saturated in ring A, the $\Delta^1$-5α-3-keto compounds from the saturated 5α-3-ketones, while for preparing the $\Delta^{1,4}$-3-keto compounds both the saturated 5β and 5α-3-ketones and also the $\Delta^4$ and the $\Delta^1$-3-ketones can be used. The quantity of the selenium compound used for the dehydrogenation is adapted to the number of double bonds which have to be introduced, in which for each double bound somewhat more than 1 equivalent of $SeO_2$ is used.

The starting substances may have any steric configuration and may also occur as racemates; they may belong to the 3-ketones of the compounds of the cholestane, spirostane, furostane, cholane, norcholane, bisnorcholane, pregnane, or androstane series. Also the 3-keto-18 or 19-nor compounds, as well as the 18,19-bisnor compounds and also the C-nor and D-homo steroids may be used as starting products. They may be saturated or may contain double bonds, e.g. in the 1 or 4 position, and may contain further substituents, such as free or functionally converted oxy, oxo groups, or halogen atoms, e.g. in the 9 position. Especially important starting substances are progesterone, 11-dehydro progesterone, 11, 12, 14, 15, 16, 17, 18, or 19-oxy-progesterone, 11-desoxycorticosterone, cortisone, hydrocortisone, 11-epi-hydrocortisone, aldosterone, 18-oxy-corticosterone, 11-epi-18-oxy-corticosterone, 17α-oxy-aldosterone, 18-oxy-hydrocortisone, 18-oxy and 18-oxo-cortisone, 18-oxy and 18-oxo-cortexone, 17α-oxy-cortexone, 17α,18-dioxy-cortexone, corresponding compounds saturated in 1 or in 4 and 6 position instead of in 4 position, e.g.

$\Delta^{4,6}$-17α,21-dihydroxy-3,11,20-trioxo-pregnadiene;
$\Delta^{4,6}$-11β,17α,21-trihydroxy-3,20-dioxo-pregnadiene;
$\Delta^{4,6}$-11β,21-dihydroxy-3,20-dioxo-pregnadiene;
$\Delta^{4,6}$-21-hydroxy-3,11,20-trioxo-pregnadiene;
$\Delta^{4,6}$-21-hydroxy-3,20-dioxo-pregnadiene;
$\Delta^{4,6}$-17α,21-dihydroxy-3,20-pregnadiene;
$\Delta^{4,6}$-11β,21-dihydroxy-3,20-dioxo-pregnadiene-18-al;
$\Delta^{4,6}$-11α,21-dihydroxy-3,20-dioxo-pregnadiene;
$\Delta^{4,6}$-11α,17α,21-trihydroxy-3,20-dioxo-pregnadiene;
$\Delta^{4,6}$-11β,17α,21-trihydroxy-9α-fluoro-3,20-dioxo-pregnadiene;
$\Delta^{4,6}$-11β,17α,21-trihydroxy-9α-chloro-3,20-dioxo-pregnadiene;
$\Delta^{4,6}$-11β,17α-21-trihydroxy-9α-bromo-3,20-dioxo-pregnadiene;
$\Delta^{4,6}$-17α,21-dihydroxy-9α-fluoro-3,11,20-trioxo-pregnadiene;
$\Delta^{4,6}$-17α,21-dihydroxy-9α-chloro-3,11,20-trioxo-pregnadiene;
$\Delta^{4,6}$-17α,21-dihydroxy-9α-bromo-3,11,20-trioxo-pregnadiene;
$\Delta^{4,6}$-2-methyl-11β,17α,21-trihydroxy-3,20-dioxo-pregnadiene;
$\Delta^{4,6}$-2-methyl-17α,21-dihydroxy-3,11,20-trioxo-pregnadiene;
$\Delta^{4,6}$-2-methyl-11β,17α,21-trihydroxy-9-halo-3,20-dioxo-pregnadiene;
$\Delta^{4,6}$-2-methyl-17α,21-dihydroxy-9-halo-3,11,20-trioxo-pregnadiene;
$\Delta^{4,6}$-3,20-dioxo-12α-fluoro-11β,21-dioxy-pregnadiene, and the corresponding 11-keto compounds;

further important starting substances are pregnane-3,20-dione, allopregnane-3,20-dione, pregnane and allopregnane-3,11,20-trione-17α,21-diol, pregnane and allopregnane-3,20-dione-11β,17α,21-triol, pregnane and allopregnane, 3,18,20-trione-11β,21-diol, pregnane and allopregnane-3,20-dione-11β,18,21-triol, pregnane and allopregnane-3,20-dione-18,21-diol, the corresponding 21-oxo compounds and/or 2-bromo, 2-chloro, 4-bromo, 4-chloro, 9α-halogen derivatives, such e.g. as 9α-fluoro derivatives, e.g. 9α-fluoro-cortisone, 9α-fluoro-allodihydro-hydrocortison, 9α-fluoro-hydrocortisone, 9α-fluoro-aldosteron, and 9α-fluoro-18-oxy-corticosterone, 2-methyl-9α-fluoro-hydrocortisone, e.g. 3,20-dioxo-11β,17α-dioxy-12α-fluoro-pregnane, $\Delta^4$ - 3,20 - dioxo - 11β-oxy-12α-fluoro-pregnene, $\Delta^4$ - 3,20 - dioxo - 11β,21 - dioxy-12α-fluoro-pregnene, 2-methyl - hydrocortisone, 9,11β - oxido-cortexone, -hydrocortexone, 9,11β - oxido - 17α - oxy-cortexone and -hydrocortexone, androstane or testan-3-one-17-ols, -3-one-17-ones, -3,11,17-triones, -3-one-11,17-diols, corresponding derivatives unsaturated in 4 or 1 or 4 and 6 position, such e.g. which bear 9α position halogen atoms, such especially as fluoro atoms, further $\Delta^{4,6}$-3,17-dioxo-androstadiene, $\Delta^{4,6}$-3-oxo-17β-oxy androstadiene and $\Delta^{4,6}$-3-oxo-17β-oxy-17α-methyl-androstadiene and finally functional derivatives of any of the aforesaid compounds which contain a free oxo group in the 3-position. In the starting materials the functionally converted oxy groups may be, e.g., a hydroxyl group esterified with an aliphatic, aromatic, or heterocyclic carboxylic acid, e.g. acetic acid, trimethyl acetic acid, benzoic acid, or furane carboxylic acid or an etherified hydroxyl group, e.g. the tetrahydropyranyloxy-, benzyloxy or triphenylmethoxy group. Functionally converted oxo groups are advantageously ketalised oxo groups, derived especially from a bivalent alcohol, such as ethylene-dioxy groups.

As selenium compounds having a dehydrogenating action are considered above all selenium dioxide, e.g. in sublimed form, or selenious acid. The dehydrogenation of the present process may be carried out in an aqueous or non-aqueous organic solvent, carried out in an open or closed vessel. Preferably the reaction is carried out in the presence of tertiary alcohols, such as tertiary butanol or tertiary amyl alcohol. As solvents also the following, especially mixed with the said alcohols, may be used: dioxane, glacial acetic acid, acetic acid anhydride, methanol, ethanol, isopropanol, polyvalent alcohols, such as ethylene glycol, benzene, toluene, hexane, ethylether, dibutyl ether, tetrahydrofurane, Cellosolve, carbon tetrachloride, anisol, pyridine, ethylacetate, acetonitrile, and mixtures of these solvents.

The reaction is accelerated by the presence of an inorganic or organic acid, preferably an organic acid, such as acetic acid, propionic acid, or benzoic acid. The organic acid, e.g. acetic acid or propionic acid, may in some cases at the same time serve as a solvent for the reaction components. If the reaction is performed in the presence of water and a solvent mixable with water, e.g. an alcohol, the addition of an acid other than the $H_2SeO_3$, serving as dehydrogenating agent, is not strictly necessary to accelerate the reaction.

It is of advantage to choose a suitable solvent or solvent mixture and to heat the compound to be dehydrogenated, if desired under pressure, or to reflux it with the dehydrogenating agent. For the introduction of a double bond the calculated quantity of the selenium compound or a certain excess is generally applied. An excess of the dehydrogenating agent, e.g. selenium dioxide, can be eliminated after the reaction, e.g. by means of lead acetate, sulphur dioxide or other reducing agents. After completion of the reaction the mixture of formed selenium is filtered off and the reaction product is isolated from the filtrate in a method known per se. The removal of selenium and selenium derivatives is carried out by methods in themselves known.

The further purification of the reaction products may be carried out especially by chromatography, e.g. over aluminium oxide or silica gel, by distribution methods, e.g. according to the counter-current method, or by separation by means of Grignard reagents, such as trimethyl ammonium or pyridinium acetic acid hydrozide. Following the purification or instead of it, the products may be recrystallised from organic or aqueous organic solvents.

The reaction products obtained by the process may be converted into their functional derivatives by methods in themselves known, e.g. esters, ethers, enol esters, enol ethers, ketals, thioethers and thioketals, and also hydrazones, oximes, and enamines. In these compounds the hydroxyl groups and/or oxo groups may be completely or partially functionally converted.

In the esters and enol esters the acid residues may be those of any desired organic or inorganic acids e.g. aliphatic, alicyclic, araliphatic, aromatic, or heterocyclic carboxylic, thion-carboxylic, thiol-carboxylic, or sulphonic acids, preferably formic acid, acetic acid, chloracetic acids, trifluoro acetic acid, propionic acid, butyric acids, valeric acids, trimethyl-acetic acid, diethyl-acetic acid, caproic acids, oenanthic acids, caprylic - acids, palmitic acids, crotonic acid, undecanic acid, undecylenic acid, oxalic acid, succinic acid, pimelic acid, maleic acid, lactic acid, carbamic acids, alkoxy carboxylic acids, $\beta$-cyclopentyl propionic acid, hexa-hydrobenzoic acid, benzoic acid, phenyl acetic acid, cyclohexyl acetic acid, $\gamma$-cyclohexyl butyric acid, phenyl propionic acids, trimethyl-gallic acid, phthalic acid, furane-2-carboxylic acid, isonicotinic acid, methane sulphonic acid, toluene sulphonic acid, sulphuric acids, hydrohalic acids, or phosphoric acids.

If desired, any functionally converted hydroxyl or oxo groups in the compounds obtained may be converted into the free groups. In this manner, especially in polysubstituted derivatives, functionally converted groups may also partially be liberated. This may be carried out, e.g. by chemical or enzymatic hydrolysis, e.g. with the use of acid or basic agents, by re-esterification or re-acetalisation. From the partially functionally converted, such as esterified or etherified derivatives, obtained in this manner or obtained directly, there may be made by subsequent functional conversion, e.g. esterification or etherification, polysubstituted derivatives, and especially mixed esters, ethers or ester-ethers.

The following examples illustrate the invention, the temperatures being stated in ° C.

EXAMPLE 1

1 g. of cortisone acetate and 400 mg. of selenium dioxide are covered with 1 cc. of acetic anhydride and 50 cc. of tertiary butanol. The mixture is boiled for 48 hours with the exclusion of moisture under reflux, and then the mixture is decanted from the precipitated selenium. The selenium is washed with a small amount of acetone, and the combined solutions are evaporated to dryness after the addition of alcohol. The brown residue is dissolved in ethyl acetate. The ethyl acetate solution is washed with dilute potassium carbonate solution and water, dried and evaporated. The residue is chromatographed over 27 g. of silica gel, and elutriation is carried out in succession with chloroform, mixtures of chloroform and tertiary butanol in the ratios 99:1, 98:2, 96:4, and finally with acetone. The combined chloroform-tertiary butanol 98:2-elutriates are evaporated in vacuo, the residue is dissolved in acetone, and the solution is treated with a small amount of active carbon. From the evaporated solutions, after adding thereto a small amount of ether or isopropyl ether, there crystallises out 1-dehydro-cortisone acetate, which by paper chromatography in the system propylene glycol-toluene is found to be a unitary product and melts at 226–232° C. (with decomposition).

By reacting 1 g. of allo-4,5-dihydrocortisone acetate with 800 mg. of selenium dioxide in an analogous manner, there is obtained by working up in the manner described above 1-dehydro-cortisone acetate melting at 226–232° (with decomposition).

EXAMPLE 2

1 g. of 3,11,20-trioxo-17α-oxy-21-acetoxy-pregnane and 800 mg. of selenium dioxide are boiled in a mixture of 1 cc. of acetic anhydride and 50 cc. of butanol for 48 hours. The reaction product is worked up and purified as described in Example 1, whereby 1-dehydro-cortisone acetate melting at 226–232° (with decomposition) is obtained.

EXAMPLE 3

1 g. of cortexone acetate and 400 mg. of selenium dioxide are covered with 1 cc. of acetic anhydride and 50 cc. of tertiary butanol. The mixture is boiled under reflux for 48 hours with the exclusion of moisture, and then the precipitated selenium is separated. The selenium is washed with acetone, and the combined solutions are evaporated in vacuo after the addition of alcohol. The residue is dissolved in ethyl acetate. The ethyl acetate solution is washed with dilute potassium carbonate solution, dried and evaporated. The residue is then chromatographed over 30 g. of aluminium oxide, elutriation being carried out in succession with benzene, ether and acetone. From the residue obtained by evaporating the ether elutriate there can be obtained by recrystallisation from a mixture of acetone and isopropyl ether pure 1-dehydro-cortexone acetate melting at 203–206° C.

EXAMPLE 4

1 g. of 3,11,20-trioxo-17α-oxy-21-acetoxy-allopregnane and 800 mg. of selenium dioxide are mixed with 50 cc. of butanol. The suspension is boiled for 48 hours under reflux, the solution is then decanted from the precipitated selenium, and the selenium is washed with acetone, and the solvent mixture is evaporated in vacuo. The residue is dissolved in ethyl acetate. The ethyl acetate solution is washed with freshly prepared ammonium sulphide solution, dilute potassium bicarbonate solution and water, then dried and evaporated in vacuo. The residue is then dissolved in a small amount of isopropyl alcohol and cooled. Upon allowing the solution to stand, 650 mg. of 1-dehydro-cortisone acetate crystallise out. The crystals melt at 200° C., and in the melt needles or prisms then form which are completely fused only at 230° C. The crude product is purified by treating it in solution in acetone with a small amount of active carbon, and then the product is recrystallised from acetone or a mixture of acetone and isopropyl ether. In this manner there is obtained pure 1-dehydro-cortisone acetate melting at 226–232° C., and having the specific rotation $(\alpha)_D = 186°$ in dioxane. There can be obtained from the mother-liquors by chromatography over silica gel, as described in the preceding examples, further quantities of pure 1-dehydro-cortisone acetate.

If the free 21-oxy-compound is used as starting material 1-dehydro-cortisone melting at 231–234° C., and having the specific rotation $(\alpha)_D = +169°$ in dioxane, is obtained.

EXAMPLE 5

1 g. of $\Delta^4$-3-oxo-17$\alpha$-acetoxy-androstene (testosterone acetate) and 500 mg. of selenium dioxide are covered with 50 cc. of butanol. The suspension is boiled for 48 hours under reflux, cooled, and the solution is decanted from the precipitated selenium, the selenium is washed with acetone, and the combined solutions are evaporated in vacuo. The residue is dissolved in ethyl acetate and the solution is washed with a freshly prepared ammonium sulphide solution, water, dilute potassium carbonate solution and water, dried, and evaporated. The residue is then chromatographed over aluminium oxide. The residues obtained by evaporating the benzene, benzene-ether and ether elutriates yield upon recrystallisation from a mixture of ether and pentane needles of $\Delta^{1,4}$-3-oxo-17$\alpha$-acetoxy-androstadiene (1-dehydro-testosterone acetate), melting at 151–152° C.

EXAMPLE 6

1 g. of 3,20-dioxo-11$\beta$,17$\alpha$-dioxy-21-acetoxy-allopregnane and 800 mg. of selenium dioxide are boiled in 50 cc. of tertiary butanol for 48 hours under reflux. The solvent is then decanted from the precipitated selenium, the selenium is washed with acetone and the solvent mixture is evaporated in vacuo. The residue is dissolved in ethyl acetate, the ethyl acetate solution is washed with freshly prepared ammonium sulphide solution, dilute potassium bicarbonate solution and water, and then dried and evaporated in vacuo. The residue is dissolved in a small amount of isopropyl alcohol and cooled. Upon allowing the solution to stand, 600 mg. of 1-dehydro-hydrocortisone acetate crystallise out. The crude product is purified by treating it in solution in acetone with a small amount of active carbon, and the product is then recrystallised from acetone or a mixture of acetone and isopropyl ether. In this manner there is obtained pure 1-dehydro-hydrocortisone acetate melting at 238–241° C. From the mother liquors there can be obtained by chromatography over silica gel, in the manner described in the preceding examples, further quantities of pure 1-dehydro-hydrocortisone acetate.

EXAMPLE 7

1 g. of 3,20-dioxo-9$\alpha$-fluoro-11$\beta$,17$\alpha$-dioxy-21-acetoxy-allo-pregnane and 800 mg. of selenium dioxide are covered with 50 cc. of tertiary butanol. The suspension is boiled for 48 hours under reflux, and after being cooled the solution is decanted from precipitated selenium. The selenium is washed with acetone and the combined solutions are evaporated in vacuo. The residue is dissolved in ethyl acetate, and the solution is washed with a freshly prepared ammonium sulphide solution, water, dilute potassium carbonate solution and water, then dried and evaporated. The residue is then chromatographed over silica gel. The residues from the evaporated benzene, benzene-ether and ether elutriates yield, on recrystallisation from a mixture of ether and pentane, crystals of 1-dehydro-9$\alpha$-fluoro-hydrocortisone acetate melting at 239° C.

EXAMPLE 8

1 g. of 9$\alpha$-fluoro-hydrocortisone acetate and 500 mg. of selenium dioxide are boiled in 50 cc. of tertiary butanol for 48 hours. The reaction product is worked up and purified as described in Example 7, whereby 1-dehydro-9$\alpha$-fluoro-hydrocortisone acetate melting at 239° C. is obtained.

EXAMPLE 9

100 mg. of aldosterone-21-monoacetate and 50 mg. of selenium dioxide are boiled in 5 cc. of butanol for 48 hours under reflux. After cooling the mixture, the solution is decanted from the precipitated selenium, the selenium is washed with acetone, and the combined solutions are evaporated in vacuo. The residue is dissolved in ethyl acetate, and the ethyl acetate solution is washed with a freshly prepared ammonium sulphide solution, water, dilute ice-cold potassium bicarbonate solution and water, then dried and evaporated. From the residue 1-dehydro-aldosterone - 21 - monoacetate is obtained by chromatography over silica gel and crystallisation from a mixture of acetone and isopropyl ether. M.P. 182–185°.

In an analogous manner, starting from aldosterone diacetate, its 1-dehydro derivative can be obtained, from 18-oxy corticosterone the 1-dehydro-18-oxy corticosterone, from 18-oxy cortexone the 1-dehydro-18-oxy cortexone, and from 18-oxo cortexone the 1-dehydro-18-oxo cortexone.

EXAMPLE 10

A suspension of 1 g. of cortexone-21-trimethyl acetate (desoxycorticosterone-trimethyl acetate) and 550 mg. of selenium dioxide in a mixture of 50 cc. of t.amyl alcohol and 500 mg. of trimethyl acetic acid is refluxed under nitrogen for 18 hours. The process of the reaction mixture is carried out as described in the previous examples. The crude 1-dehydro-cortexone-21-trimethyl acetate can be purified by recrystallisation from acetone. In the paper chromatogram in the system formamide-cyclohexane at 40° the new compound runs somewhat slower than cortexone-trimethyl acetate and gives no fluorescence in sodium hydroxide solution in U.V. light.

In an analogous manner the 1,11-bisdehydro-corticosterone-21-acetate of M.P. 231–234° is obtained from 11-dehydro-corticosterone-21-acetate.

EXAMPLE 11

A suspension of 2 g. of cortisol-21-trimethyl acetate and 1.4 g. of selenium dioxide in a mixture of 60 cc. of tertiary butanol and 0.3 g. of trimethyl acetic acid is heated to boiling under reflux under nitrogen for totally 24 hours, to which, after 15 hours, another 0.2 g. of selenium dioxide is added. The process of the reaction mixture is carried out as described in Example 10. Then the recovered brown residue is chromatographed over aluminium oxide. The residue of the evaporated benzene-ether eluates is recrystallised from acetone or ethyl acetate, in which pure 1-dehydro-cortisol-21-trimethyl acetate of M.P. 234–236° is obtained.

In an analogous manner the 1-dehydro-corticosterone-21-acetate of M.P. 159–161° is obtained from corticosterone-21-acetate, and the 1-dehydro-cortisol-21-acetate of M.P. 237–239° (decomposition) from cortisol-21-acetate.

EXAMPLE 12

A suspension of 1 g. of cortisone and 450 mg. of selenium dioxide in 50 cc. of tertiary butanol is refluxed under nitrogen for 48 hours. The process of the reaction mixture is carried out as described in Example 10. The recovered brown residue is chromatographed over silica gel in which it is first washed with chloroform. The further chloroform-tertiary butanol (24:1) eluates are evaporated. The residue is crystallised from isopropanol-ether or acetone-ether mixture and the 1-dehydro-cortisone of M.P. 231–234° (decomposition) is obtained.

In an analogous manner the 1-dehydro-17$\alpha$-hydroxycortexone-21-acetate of M.P. 218–222° is obtained from 17α-hydroxy-cortexone-21-acetate, the 1-dehydro-cortisone-21-trimethyl acetate of M.P. 274–278° from cortisone-trimethyl acetate, and the 1-dehydro-cortisone-21-acetate of M.P. 226–232° from Δ¹-3,11,20-trioxo-17α-oxy-21-acetoxy-allopregnane.

EXAMPLE 13

A suspension of 1 g. of cortisone acetate in 40 cc. of Cellosolve (ethyleneglycol-monoethyl ether) and 0.4 cc. of glacial acetic acid is mixed with 400 mg. of selenium dioxide and is heated at 100° for 30 hours. Then it is decanted from the formed selenium and washed with little acetone. The acetone is evaporated in vacuo, the clear solution is mixed with much water, and extracted with ethyl acetate. The ethyl acetate solutions are processed according to Example 1 in which also 1-dehydrocortisone acetate can be isolated.

If the reaction is carried out at an elevated temperature, e.g. at boiling-point of the mixture, the reaction time can advantageously be shortened somewhat.

EXAMPLE 14

A suspension of 1 g. of cortisone acetate in 50 cc. of benzene and 0.5 cc. glacial acetic acid is mixed with 500 mg. of selenium dioxide and boiled under reflux for 48 hours. The reaction mixture is processed according to Example 1 in which also 1-dehydrocortisone acetate can be isolated.

EXAMPLE 15

50 cc. of tertiary butanol and 1 cc. of glacial acetic acid are poured on 250 mg. of 9α-fluoro-cortisone acetate and 125 mg. of selenium dioxide. The mixture is boiled for 24 hours under reflux, another 125 mg. of selenium dioxide are added, the mixture is boiled for another 24 hours and then decanted from the formed selenium. The selenium is washed with methanol and the combined solutions are evaporated in vacuo. The residue is dissolved in ethyl acetate. The ethyl acetate solution is washed with dilute potassium carbonate solution, with icy-cold, freshly prepared ammonium sulphide solution, with icy-cold ammonia solution, and finally with water, then dried and evaporated. Now the obtained residue is chromatographed on paper in the system formamide-benzene-chloroform (1:1). The spots of the paper determined in U.V.-light, which contain the 1-dehydro-compound are cut out and extracted with 50% methanol-water mixture. The obtained solution is concentrated, extracted with ethyl acetate, the extract is dried and evaporated. The residue is recrystallised from methanol or from acetone-isopropyl ether mixtures, in which pure 1-dehydro-9α-fluoro-cortisone acetate of M.P. 273–276° (decomposition), $(\alpha)_D^{23} = +156° \pm 4°$ (in ethanol), is obtained.

EXAMPLE 16

3 g. of Δ⁴-3,17-dioxoandrostene are dissolved in 50 cc. of glacial acetic acid. 1.8 g. of selenium dioxide are added after which the mixture is boiled under reflux for 17 hours. After processing the Δ¹,⁴-3,17-dioxoandrostadiene is obtained with a M.P. of 168° C. $(\alpha)_D = +22°$ (in dioxane).

EXAMPLE 17

1.8 g. of 17α,21-dihydroxy-3,11,20-trioxo-pregnane-21-acetate and 0.55 g. of selenium dioxide are dissolved in 35 cc. of t-butanol and 7 cc. of glacial acetic acid. After boiling under nitrogen for 45 minutes the reaction mixture is processed. From acetone, crystals of the Δ⁴-17α,21-dihydroxy-3,11,20-trioxopregnene-21-acetate, melting at 238–242°, are obtained.

EXAMPLE 18

0.3 g. of 17α,21-dihydroxy-3,11,20-trioxoallopregnane-21-acetate and 0.15 g. of selenium dioxide are dissolved in 10 cc. of toluene and 2 cc. of glacial acetic acid. After boiling for 5 hours a sample of the reaction mixture is processed and investigated chromatographically on paper. Two spots corresponding to that of the Δ¹-17α,21-dihydroxy-3,11,20-trioxoallopregnene-21-acetate and to that of the Δ¹,⁴-17α,21-dihydroxy-3,11,20 - trioxopregnadiene-21-acetate have been demonstrated.

EXAMPLE 19

0.6 g. of 11β,17α,21-trihydroxy-3,20-dioxopregnane-21-acetate (melting-point 215–216°) and 0.18 g. of selenium dioxide are dissolved in 8 cc. t-butanol and 1.5 cc. of glacial acetic acid and the mixture is boiled under nitrogen for 1 hour. The process yields the Δ⁴-11β,17α,21-trihydroxy-3,20-dioxopregnene-21-acetate melting at 221–223°.

EXAMPLE 20

A suspension of 0.5 g. of Δ⁴,⁶-17α,21-dihydroxy-3,11,20-trioxo-pregnadiene-21-acetate and 200 cc. of selenium dioxide in 50 cc. of t-butanol is boiled under reflux in nitrogen atmosphere, while stirring, for 24 hours. After about 6 hours everything has gone into solution. The precipitated selenium is filtered off, the resulting filtrate is evaporated to a small volume and diluted with chloroform. Subsequently the chloroform solution is washed with a cold, dilute sodium hydroxide solution and with water. After drying on sodium sulphate the solvent is evaporated to dryness under reduced pressure. The resulting residue gives crystals in alcoholic solution of the Δ¹,⁴,⁶-17α,21-dihydroxy-3,11,20-trioxo pregnatriene. The M.P. is 225° C. In U.V.-light the substance shows the characteristic maxima at 222 mµ, 254 mµ, and 298 mµ.

EXAMPLE 21

A suspension of 0.5 g. of Δ⁴,⁶-11β,17α,21-trihydroxy-3,20-dioxo pregnadiene-21-acetate and 200 mg. of selenium dioxide in 50 cc. of t-butanol is boiled under reflux in nitrogen atmosphere, while stirring, for 24 hours. After 6 hours the reaction is completed, after which the resulting Δ¹,⁴,⁶-11β,17α,21-trihydroxy-3,20 - dioxo-pregnatriene is isolated according to the method described in Example 20.

In the same way the Δ¹,⁴,⁶-17α,21-dihydroxy-9-halo-3,11,20-trioxo pregnatriene compounds and the Δ¹,⁴,⁶-11β,17α,21-trihydroxy-9α-halo-3,20-dioxo pregnatriene compounds can be prepared from the corresponding Δ⁴,⁶-3-ketones.

EXAMPLE 22

1 g. of hydrocortisone acetate and 400 mg. of selenium dioxide are dissolved in 50 cc. of tertiary butanol and 2.5 cc. of acetic acid. After boiling under reflux for 22 hours the precipitated selenium is filtered, the filtrate is evaporated, the residue is dissolved in chloroform and the chloroform solution is washed with cold sodium hydroxide solution and with water, dried and evaporated. Crystallisation of the residue from acetone yields Δ¹-dehydro-hydrocortisone acetate. From the mother-liquors the mono-selenium derivative is obtained, M.P. 299° (with decomposition).

*Analysis.*—calculated for $C_{23}H_{32}O_6Se$: C, 57.38%; H, 6.28%; Se, 16.3%. Found: C, 56.90%; H, 6.14%; Se, 15.7%.

The infra-red spectrum shows bands (among others) at 6.02µ, 6.16µ, and 6.23µ.

In the same manner the mono-selenium derivative is obtained from testosterone propionate, M.P. 170–172°. Selenium content: 17.3%.

We claim:

1. A process which comprises heating at an elevated temperature a 1(2)-saturated steroid of the Δ⁴-3-keto androstene series with at least one equivalent of selenium dioxide in an organic solvent and recovering the corresponding Δ¹,⁴-3-keto androstadiene produced.

2. A process which comprises heating at an elevated temperature a 4,5-saturated steroid of the Δ¹⁽²⁾-3-keto androstene series with at least one equivalent of selenium dioxide in an organic solvent and recovering the corresponding $\Delta^{1,4}$-3-keto androstadiene produced.

3. A process which comprises heating at an elevated temperature a 4,5-saturated steroid of the $\Delta^1$-3-keto pregnene series with selenium dioxide in an inert organic solvent and recovering the corresponding $\Delta^{1,4}$-3-keto pregnadiene produced.

4. A process which comprises heating at an elevated temperature a 3-keto-steroid saturated in at least one of the $\alpha$-positions relatively to the 3-keto group, with selenium dioxide in an organic solvent selected from the group consisting of a tertiary alcohol, and a combination of a tertiary alcohol and another organic solvent, to produce the corresponding less saturated steroid selected from the group consisting of a $\Delta^1$-, $\Delta^4$-, and $\Delta^{1,4}$-3-keto-steroid.

5. Process according to claim 4, in which the tertiary alcohol is tertiary butanol.

6. Process according to claim 4, in which the tertiary alcohol is tertiary amyl alcohol.

7. Process according to claim 4, in which the treatment with selenium dioxide is carried out in presence of an acid.

8. Process according to claim 4, in which the starting material is a 3-keto-steroid of the androstane series.

9. Process according to claim 4, in which the starting material is a 3-keto-steroid of the pregnane series.

References Cited

UNITED STATES PATENTS

| | | | |
|---|---|---|---|
| 2,847,430 | 8/1958 | Beal | 260—397.45 |
| 3,079,301 | 2/1963 | Gould et al. | 167—77 |
| 3,190,897 | 6/1965 | Agnello et al. | 260—397.45 |

ELBERT L. ROBERTS, *Primary Examiner.*

U.S. Cl. X.R.

260—239.55, 397.4, 397.45, 397.47